United States Patent
Horiuchi

(10) Patent No.: US 7,292,006 B2
(45) Date of Patent: Nov. 6, 2007

(54) CONTROLLED DC POWER SUPPLY FOR A HUMAN POWERED VEHICLE

(75) Inventor: Noriyuki Horiuchi, Higashiosaka (JP)

(73) Assignee: Shimano, Inc., Sakai, Osaka (JP)

(*) Notice: Subject to any disclaimer, the term of this patent is extended or adjusted under 35 U.S.C. 154(b) by 82 days.

(21) Appl. No.: 11/307,942

(22) Filed: Feb. 28, 2006

(65) Prior Publication Data
US 2006/0261785 A1 Nov. 23, 2006

(30) Foreign Application Priority Data
May 20, 2005 (JP) .............................. 2005-148062

(51) Int. Cl.
H02J 1/00 (2006.01)
H02J 3/00 (2006.01)
H02K 7/18 (2006.01)

(52) U.S. Cl. .......................................... 322/7; 290/1 R

(58) Field of Classification Search ................ 290/1 R, 290/1 D; 180/205; 310/67 A; 322/7
See application file for complete search history.

(56) References Cited

U.S. PATENT DOCUMENTS

| | | | |
|---|---|---|---|
| 5,367,244 A * | 11/1994 | Rose et al. | 320/141 |
| 5,878,831 A * | 3/1999 | Saito et al. | 180/206 |
| 5,903,136 A | 5/1999 | Takahashi et al. | |
| 5,945,805 A | 8/1999 | Takei et al. | |
| 6,239,580 B1 | 5/2001 | Toya | |
| 6,418,041 B1 | 7/2002 | Kitamura | |
| 6,646,400 B2 * | 11/2003 | Uno | 318/479 |
| 6,768,273 B2 | 7/2004 | Uno | |
| 6,998,821 B2 * | 2/2006 | Sakai et al. | 320/138 |
| 7,235,952 B2 * | 6/2007 | Maehara | 322/24 |
| 2003/0015875 A1 * | 1/2003 | Fukaya | 290/40 C |
| 2005/0140342 A1 * | 6/2005 | Maehara et al. | 322/36 |
| 2006/0097703 A1 * | 5/2006 | Suzuki et al. | 322/20 |

FOREIGN PATENT DOCUMENTS

| | | |
|---|---|---|
| DE | 9409780 U1 | 8/1994 |
| DE | 19948798 A1 * | 5/2001 |

(Continued)

OTHER PUBLICATIONS

Stengel, et al., "Battery Charter With Load Detection and Compensation," Motorola Technical Developments, Motorola Inc., Schaumburg, IL, USA; vol. 24, Mar. 1, 1995, pp. 116-117.

(Continued)

Primary Examiner—Julio Gonzalez
(74) Attorney, Agent, or Firm—James A. Deland

(57) ABSTRACT

A DC power supply apparatus used with a power storage element comprises a rectifier circuit that converts AC current from an alternating current generator into a DC current; an input current adjusting circuit that receives DC current from the rectifier circuit to adjust current flow from the rectifier circuit to the power storage element; an output current adjusting circuit that receives current from the power storage element and adjusts current flow from the power storage element to an output node; and a control circuit that operates at least one of the input current adjusting circuit and the output current adjusting circuit based on a predetermined condition of the power storage element.

18 Claims, 16 Drawing Sheets

FOREIGN PATENT DOCUMENTS

| | | |
|---|---|---|
| EP | 0711016 A2 | 5/1996 |
| EP | 1261916 A2 | 6/2002 |
| JP | 07-046770 A | 2/1995 |
| JP | 2002-101567 A | 4/2002 |
| JP | 2003-174720 A | 6/2003 |

OTHER PUBLICATIONS

Gonzalez, et al., "Considerations To Improve The Practical Design of Universal and Full-Effective NiCd/NiMH Battery Fast Chargers," Applied Power Electronics Conference and Exposition, 1999; APEC 1999; Fourteenth Annual Dallas, TX, USA Mar. 14-18, 1999; Piscataway, NJ, USA, IEEE, US; vol. 1, pp. 167-173.

European Search Report for EP 06 01 0558, the European equivalent of this application; dated Aug. 21, 2006.

* cited by examiner

CONTROLLED DC POWER SUPPLY FOR A HUMAN POWERED VEHICLE

BACKGROUND OF THE INVENTION

The present invention is directed to DC power supplies used in human powered vehicles and, more particularly, to a controlled DC power supply for a bicycle.

Conventional electrically powered devices for human powered vehicles such as bicycles include lighting devices such as headlamps and tail lamps for night time illumination. Such devices often are powered by a dynamo (AC generator) mounted on the bicycle. In recent years, however, many conventional manually operated bicycle devices are now being controlled electrically, so the number of electric components mounted to the bicycle has risen. For example, some bicycles use electrically operated gear shifting systems and electrically operated suspension systems, and such systems employ electrical motors and control devices. Not surprisingly, the dynamos used to power the conventional electrical components frequently are used to power the additional electrical components. Since many of the additional components operate using DC voltage, the AC voltage generated by the dynamo first must be rectified into a DC voltage so that the DC voltage can be used by the components.

The voltage generated by the dynamo can fluctuate significantly depending upon the running speed of bicycle, and the voltage can fall as low as approximately 8 volts. On the other hand, many modern electrical devices require a certain minimum and stable voltage in order to operate properly. For example, in the case of a motor used to actuate a transmission element or a suspension element, when the applied voltage decreases, the motor may rotate at a speed less than the required speed, or the motor may entirely. This can cause a gear shifting mechanism to stop between gears and can cause a suspension system to stop adjusting to the riding conditions. Also, when a microcomputer is used to control the moving components, the microcomputer may operate erroneously or cease to function entirely. The problem can worsen when the power supply also is used to operate conventional bicycle lighting devices, since the voltage of the power supply often decreases when the lights are turned on.

Japanese Laid-Open Patent Publication No. 2002-262473 discloses a system that somewhat provides a stabilized voltage to a lamp. The system comprises a switching means disposed between a dynamo and the lamp, a battery charged by the dynamo, a rectifier circuit disposed between the dynamo and the battery to provide DC current to charge the battery, a voltage detector that detects a charged voltage of the battery, and a control means that switches the switching means on and off according to the detected battery voltage so that electric power is supplied intermittently to the lamp. Although such intermittent powering of the lamp causes the lamp to blink, the blinking can be made imperceptible by raising the blinking frequency. In any event, the supply of power to the lamp is limited when the detected battery voltage is below a predetermined value, thereby giving priority to charging of the battery. As a result, the system reduces the risk of improper operation of other electrical components powered by the battery.

Although the above-described system helps to reduce the risk of improperly lowering the battery voltage, it does so by turning the power supply to the lamp on and off according to the detected battery voltage. As a result, when the bicycle is operated for a long time at night, the battery still may become over-discharged, thereby reducing battery life. Additionally, since the voltage generated by the dynamo fluctuates significantly according to the speed of the bicycle, the voltage generated by the dynamo becomes high at high bicycle speeds, thereby risking overcharging of the battery and reducing the life of the battery.

SUMMARY OF THE INVENTION

The present invention is directed to various features of a DC power supply for a human powered vehicle. In one embodiment, a DC power supply apparatus used with a power storage element comprises a rectifier circuit that converts AC current from an alternating current generator into a DC current; an input current adjusting circuit that receives DC current from the rectifier circuit to adjust current flow from the rectifier circuit to the power storage element; an output current adjusting circuit that receives current from the power storage element and adjusts current flow from the power storage element to an output node; and a control circuit that operates at least one of the input current adjusting circuit and the output current adjusting circuit based on a predetermined condition of the power storage element. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
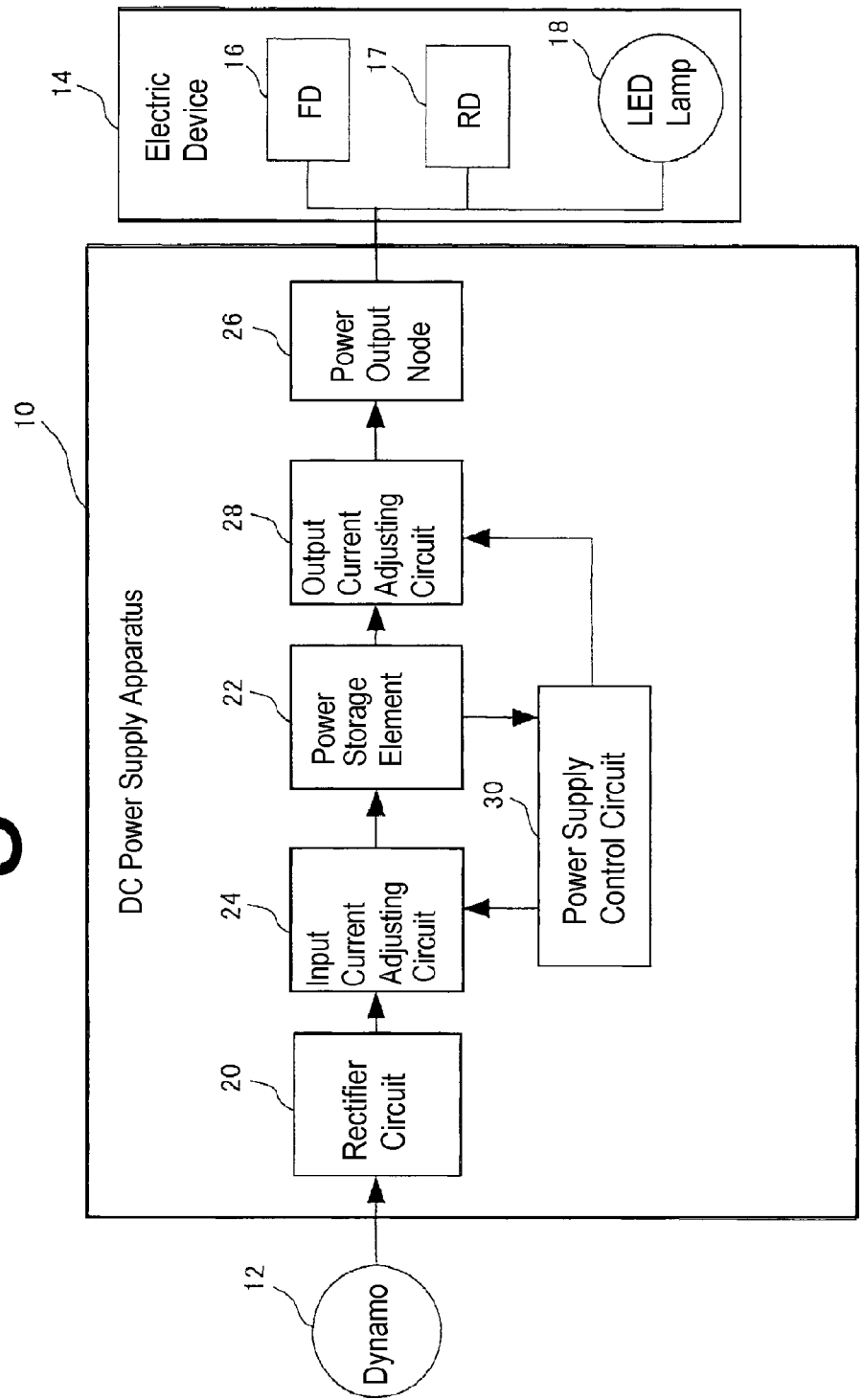
FIG. 1 is a block diagram of an embodiment of a general DC power supply apparatus.

FIG. 1 is a block diagram of an embodiment of a general direct current (DC) power supply apparatus 10. DC power supply apparatus 10 receives alternating current (AC) generated by an AC generator 12 (hereinafter referred to as a dynamo) installed in a human powered vehicle such as a bicycle, converts the alternating current into a direct current, and supplies the direct current to an electric device 14 such as a front derailleur (FD) 16, a rear derailleur (RD) 17 and/or an LED lamp 18. More specifically, DC power supply apparatus 10 comprises a rectifier circuit 20, a power storage element 22, an input current adjusting circuit 24 that receives DC current from rectifier circuit 20 and supplies adjusted DC current to power storage element 22, a power output node 26, an output current adjusting circuit 28 that receives power from power storage element 22 and supplies adjusted current to power output node 26, and a power supply control circuit 30 that controls the operation of input current adjusting circuit 24 and output current adjusting circuit 28 in response to a condition of power storage element 22.

Rectifier circuit 20 rectifies the alternating current received from dynamo 12 into direct current. Rectifier circuit 20 may comprise, for example, a half-wave rectifier circuit, a full-wave rectifier circuit, and so on. Power storage element 22 may comprise, for example, a rechargeable power storage element such as a capacitor having a large capacitance, a battery, and so on. Input current adjusting circuit 24 limits current flow to power storage element 22, and it may comprise a controllable switching element such as a field effect transistor (FET) that is capable of turning a large-capacity current on and off, a constant current circuit capable of limiting current to one or more levels, including a turned-off state, or some other current limiting element. Similarly, output current adjusting circuit 28 limits current flow to power output node 26, and it, too, may comprise a controllable switching element such as an FET that is capable of turning a large-capacity current on and off, a constant current circuit capable of limiting current to one or more levels including a turned-off state, or some other current limiting element. Power output node 26 functions as an interface between output current adjusting circuit 28 and electric device 14. In a simpler form, power output node 26 may comprise an output terminal or the like.

Power supply control circuit 30 operates at least one of the input current adjusting circuit 24 or the output current adjusting circuit 28 according to a predetermined condition of power storage element 22. Power supply control circuit 30 may comprise, for example, a microprocessor, an application specific integrated circuit, or some other programmable or hardwired control element. A predetermined condition may be, for example, a characteristic such as a kind, capacity or number of power storage elements 22, a voltage of power storage element 22, the input or output current of power storage element 22, the internal resistance of power storage element 22, the temperature of power storage element 22, the charging/discharging time of power storage element 22, a value calculated by power supply control circuit 30 and/or input by the manufacturer or user, and so on.

Figure 2:
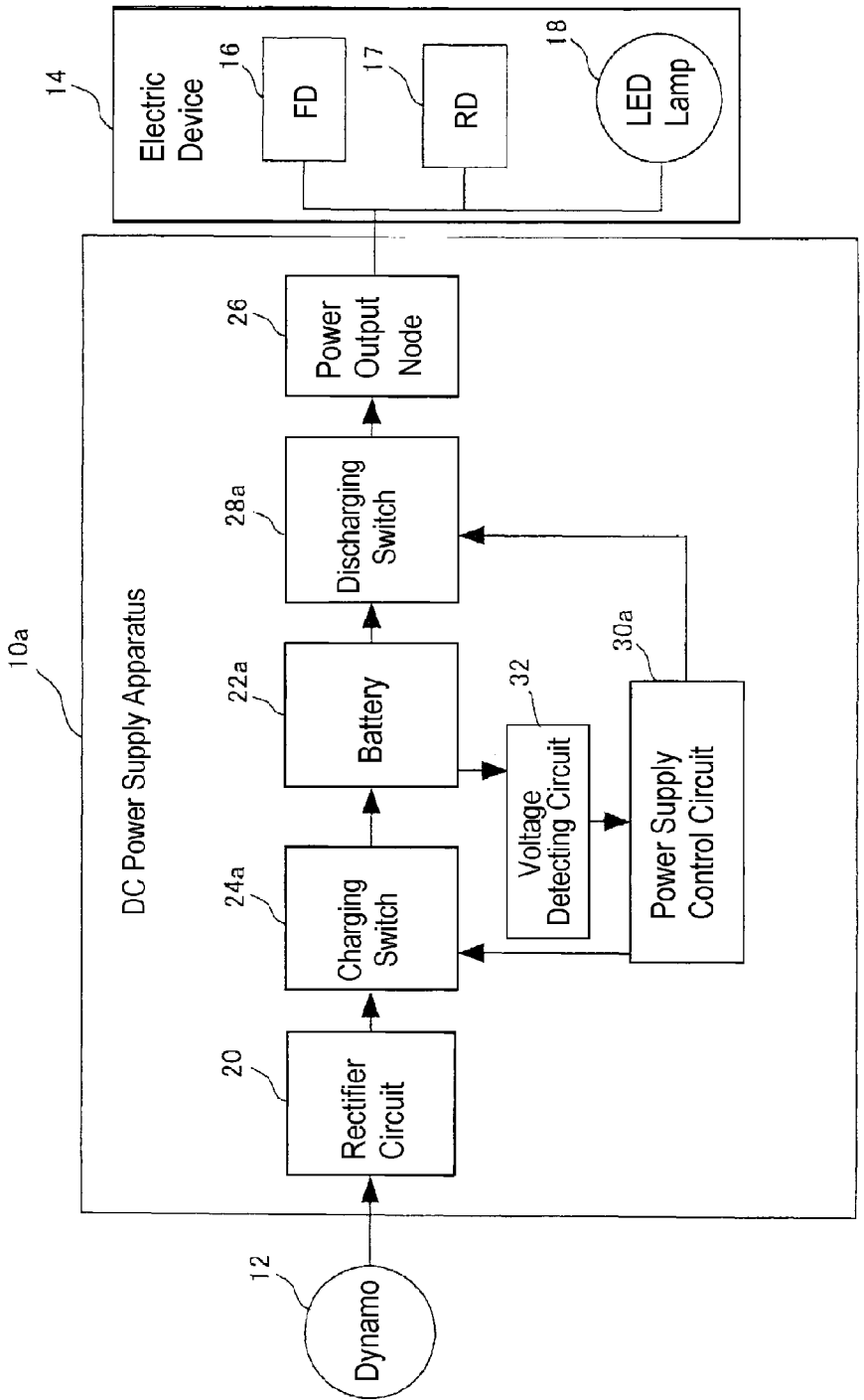
FIG. 2 is a block diagram of another embodiment of a DC power supply apparatus.

FIG. 2 is a block diagram of another embodiment of a DC power supply apparatus 10a. Components that are essentially the same as those shown in FIG. 1 are numbered the same and will not be described in detail. In this embodiment, DC power supply apparatus 10a comprises rectifier circuit 20, a rechargeable battery 22a, an input current adjusting circuit in the form of a charging switch 24a, power output node 26, an output current adjusting circuit in the form of a discharging switch 28a, a power supply control circuit 30a, and a voltage detecting circuit 32.

Battery 22a may comprise, for example, a lithium battery, a nickel-metal hydride battery, a nickel-cadmium battery, and so on. Charging switch 24a turns on and off current flowing to battery 22a, and discharging switch 24a turns on and off current flowing to electric device 14. Charging switch 24a and discharging switch 28a each may comprise, for example, a controllable switch such as an FET that is capable of turning a large-capacity current on and off. Voltage detecting circuit 32 is connected to battery 22a and to power supply control circuit 30a, and it functions to detect a voltage V of battery 22a. Power supply control circuit 30a controls charging switch 24a and discharging switch 28a according to predetermined voltages detected. For example, if a battery voltage V is greater than or equal to a set maximum voltage $V_{max}$ (e.g., about 1.4 volt per unit cell), then power supply control circuit 30a may determine that battery 22a may be in an overcharged state and control charging switch 24a to limit current flow into battery 22a. If the battery voltage V is less than or equal to a set minimum voltage $V_{min}$ (e.g., approximately 1.0 volt per unit cell), then power supply control circuit 30a may determine that battery 22a may be in an excessively discharged state and control discharging switch 28a to limit current flow out from battery 22a.

Figure 3:
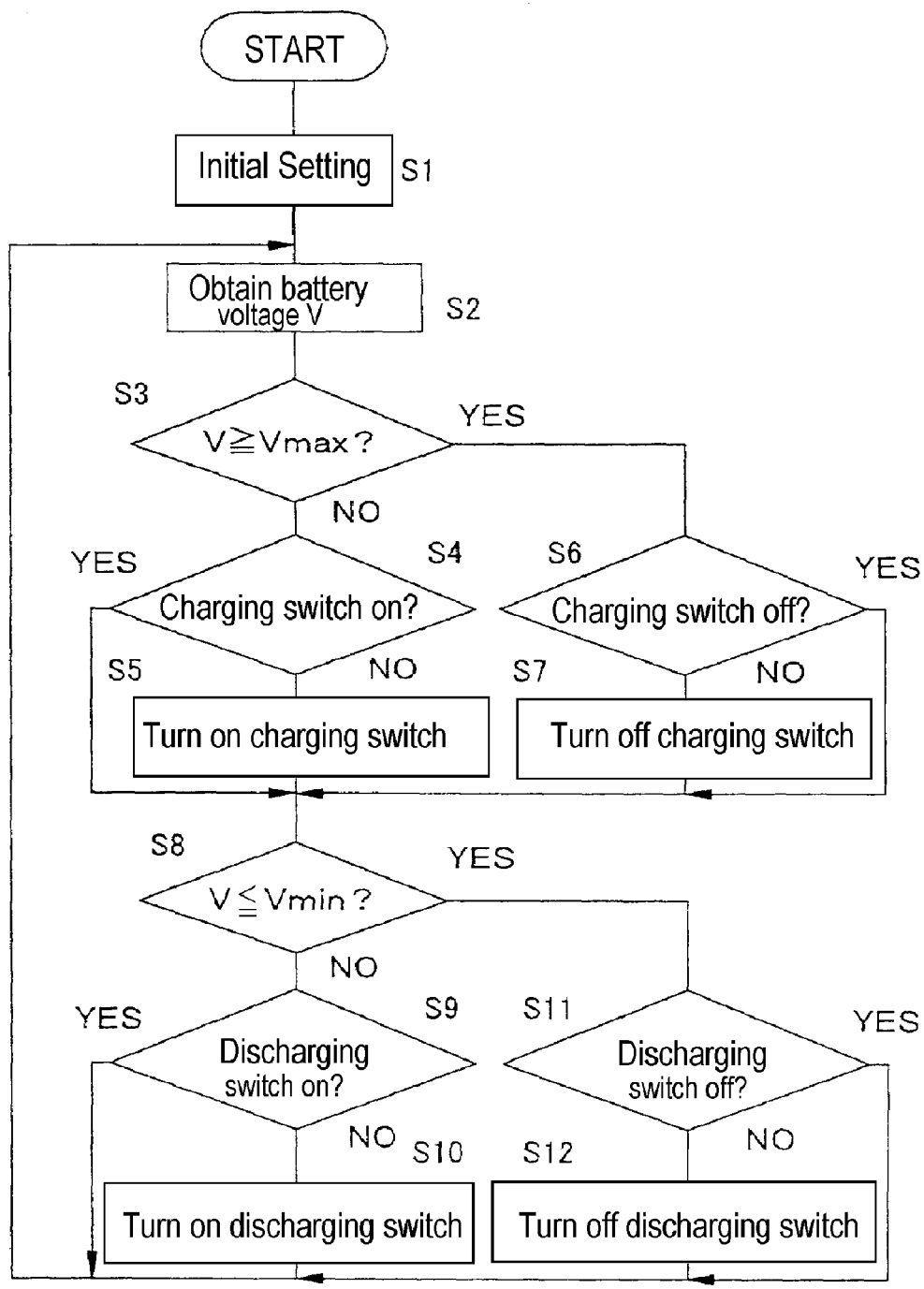
FIG. 3 is a flow chart of a particular embodiment of a routine executed by the power supply control circuit in FIG. 2.

FIG. 3 is a flow chart of a particular embodiment of a routine executed by power supply control circuit 30a. When a charged battery 22a is mounted in DC power supply apparatus 10a, an initial setting is performed in a step S1. In this initial step, a maximum voltage $V_{max}$ for detecting an overcharged state of battery 22a and a minimum voltage $V_{min}$ for detecting an excessively discharged state of battery 22a are set to predetermined values. Additionally, charging switch 24a and discharging switch 28a both are turned on. In step S2, power supply control circuit 30a obtains the detected voltage V of battery 22a from voltage detecting circuit 32.

It is then determined in a step S3 whether or not the detected battery voltage V is greater than or equal to the maximum voltage $V_{max}$ (i.e., battery 22a may be in an overcharged state). If not, then further charging of battery 22a is allowable, and it is determined in a step S4 whether or not charging switch 24a already is turned on. If not (which would be the case if charging switch 24a previously was turned off because the battery voltage V previously exceeded the maximum voltage $V_{max}$), then charging switch 24a is turned on in a step S5. Otherwise, step S5 is skipped, and the process continues in step S8.

If it is determined in step S3 that the detected battery voltage V is greater than or equal to the maximum voltage $V_{max}$ (i.e., battery 22a may be in an overcharged state), then further charging of battery 22a is not allowed, and it is determined in a step S6 whether or not charging switch 24a already is turned off. If not (which would be the case if charging switch 24a previously was turned on because the battery voltage V previously fell below the maximum voltage $V_{max}$), then charging switch 24a is turned off in a step S7. Otherwise, step S7 is skipped, and the process continues in step S8.

In any event, it is then determined in step S8 whether or not the detected battery voltage V is less than or equal to the minimum voltage $V_{min}$ (i.e., battery 22a may be in an excessively discharged state). If not, then further communication of power from battery 22a to electrical device 14 is allowable, and it is determined in a step S9 whether or not discharging switch 28a already is turned on. If not (which would be the case if discharging switch 28a previously was turned off because the battery voltage V previously fell below the minimum voltage $V_{min}$), then discharging switch 28a is turned on in a step S10. Otherwise, step S10 is skipped, and the process returns to step S2.

If it is determined in step S8 that the detected battery voltage V is less than or equal to the minimum voltage $V_{min}$ (i.e., battery 22a may be in an excessively discharged state), then further draining of battery 22a is not allowed, and it is determined in a step S11 whether or not discharging switch 28a already is turned off. If not (which would be the case if discharging switch 28a was previously turned on because the battery voltage V previously rose above the minimum voltage $V_{min}$), then discharging switch 28a is turned off in a step S12. Otherwise, step S12 is skipped, and the process returns to step S2.

As a result of this process, the condition of battery 22a easily can be detected by detecting its voltage. When the battery voltage is too high, it is determined that the battery may be overcharged, and charging switch 24a is turned off to cut off input current to battery 22a. When the battery voltage is too low, it is determined that the battery may be excessively discharged, and discharging switch 28a is turned off to prevent further discharging of battery 22a. Accordingly, battery 22a can be protected, and the risk of decreased battery life can be minimized. Of course, while voltages greater than or equal to $V_{max}$, or less than or equal to $V_{min}$ were used to control the process in the above embodiment, voltages greater than $V_{max}$ or less than $V_{min}$ may be employed, or different voltages may be set or derived.

Figure 4:
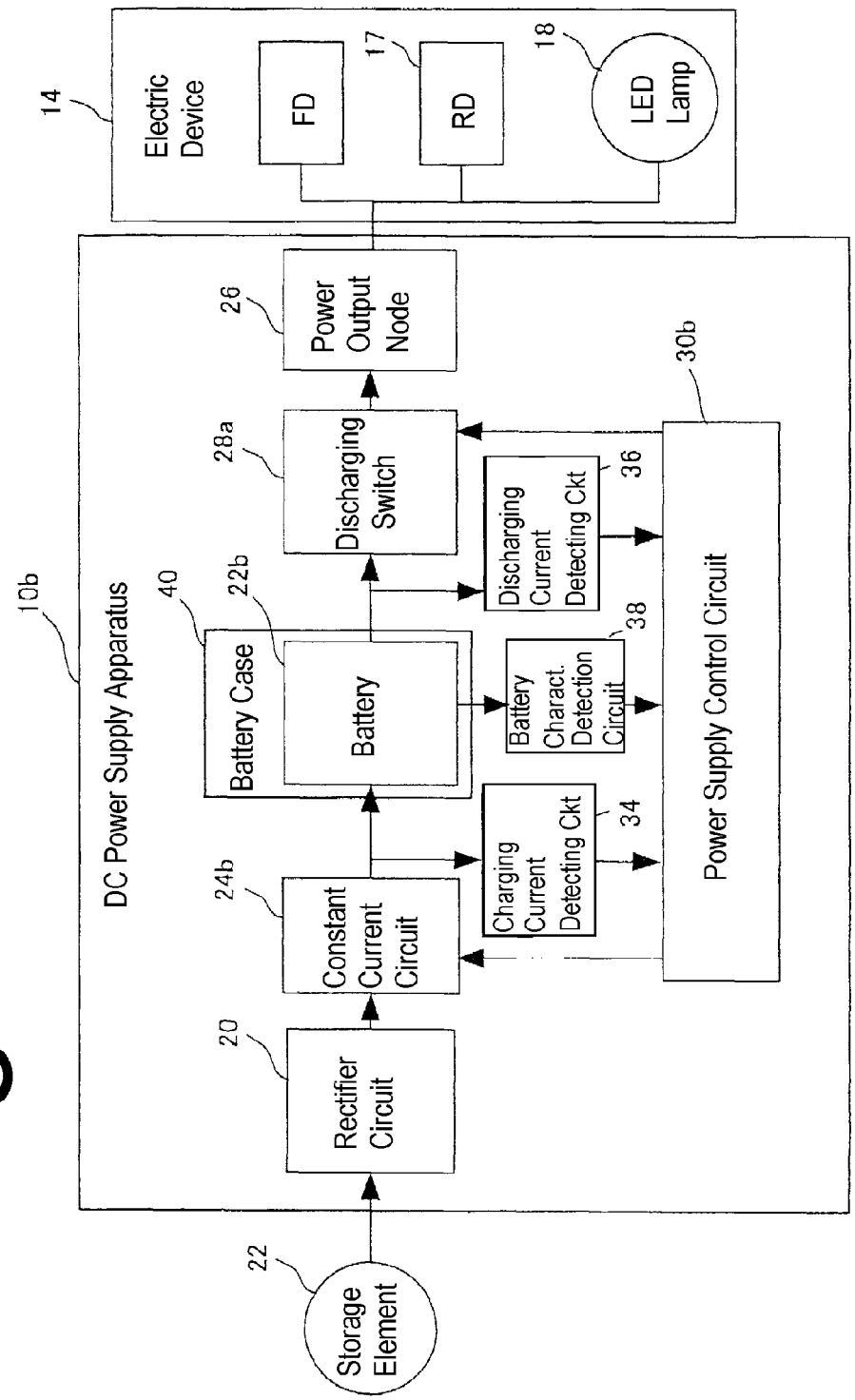
FIG. 4 is a block diagram of another embodiment of a DC power supply apparatus.

FIG. 4 is a block diagram of another embodiment of a DC power supply apparatus 10b. In this embodiment, a condition of a battery 22b is determined based on a charging current and a discharging current of the battery. Additionally, characteristics of battery 22b such as the kind, the capacity, and the number of batteries 22b are detected as further battery conditions to thereby limit current for charging battery 22b. More specifically, DC power supply apparatus 10a comprises rectifier circuit 20, a rechargeable battery 22b detachably mounted to a battery case 40, an input current adjusting circuit in the form of a constant current circuit 24b, power output node 26, discharging switch 28a, a power supply control circuit 30b, a charging current detecting circuit 34, a discharging current detecting circuit 36, and a battery characteristic detecting circuit 38.

Battery 22b may comprise, for example, one or more commercially available rechargeable AA or AAA size batteries, such as a lithium-ion battery, a nickel-metal hydride battery, a nickel-cadmium battery, and so on. In this embodiment, up to two batteries 22b of a particular size may be detachably mounted in battery case 40, and portions of battery characteristic detecting circuit 38 may be disposed in battery case 40 in order to identify characteristics of batteries mounted in battery case 40. Such a structure may include concave and convex structures disposed on the wall of battery case 40, a detecting terminal having a particular resistance value corresponding to a battery characteristic, a CPU that generates a particular signal that corresponds to a battery characteristic, and so on. As a result, the kind, the capacity and the number of batteries 22b can be detected at the time a battery 22b is mounted to battery case 40.

In this embodiment, constant current circuit 24b limits the charging current to one of a plurality of levels. For example, the charging current can be limited to, 0 mA, 1100 mA, 1200 mA, 1300 mA, 1400 mA and 1500 mA, and at least five sizes of battery 22b can be charged. Discharging switch 28a may have the same structure and function as in the previous embodiment. Charging current detecting circuit 34 detects a charging current flowing into battery 22a, and discharging current detecting circuit 36 detects a current flowing out from battery 22a to electric device 14. Power supply control circuit 30b controls constant current circuit 24b and discharging switch 28a according to the currents detected by charging current detecting circuit 34 and discharging current detecting circuit 36, as well as the information received from battery characteristic detecting circuit 38.

Figure 5:
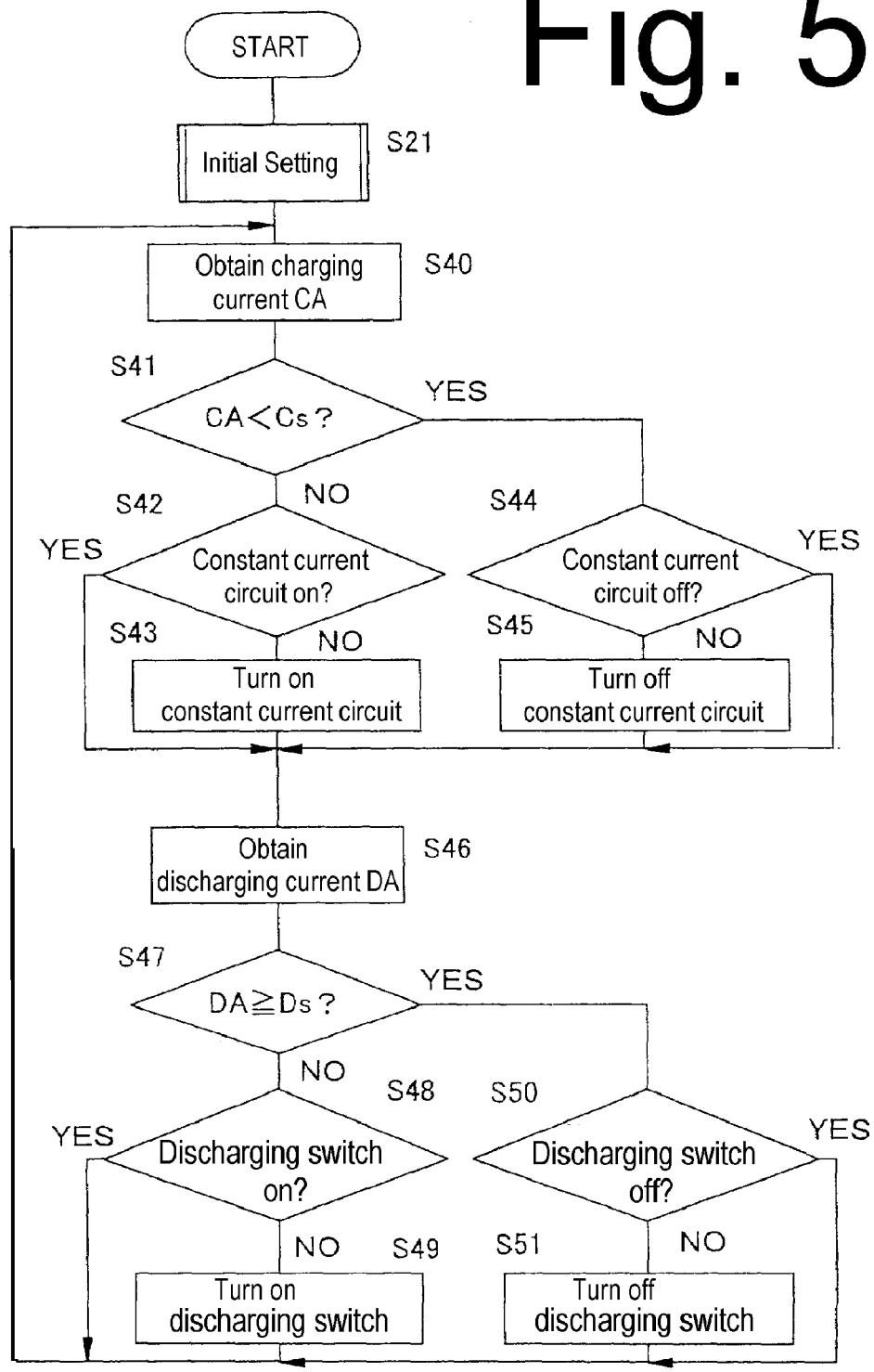
FIG. 5 is a flow chart of a particular embodiment of a routine executed by the power supply control circuit in FIG. 4.
Figure 6:
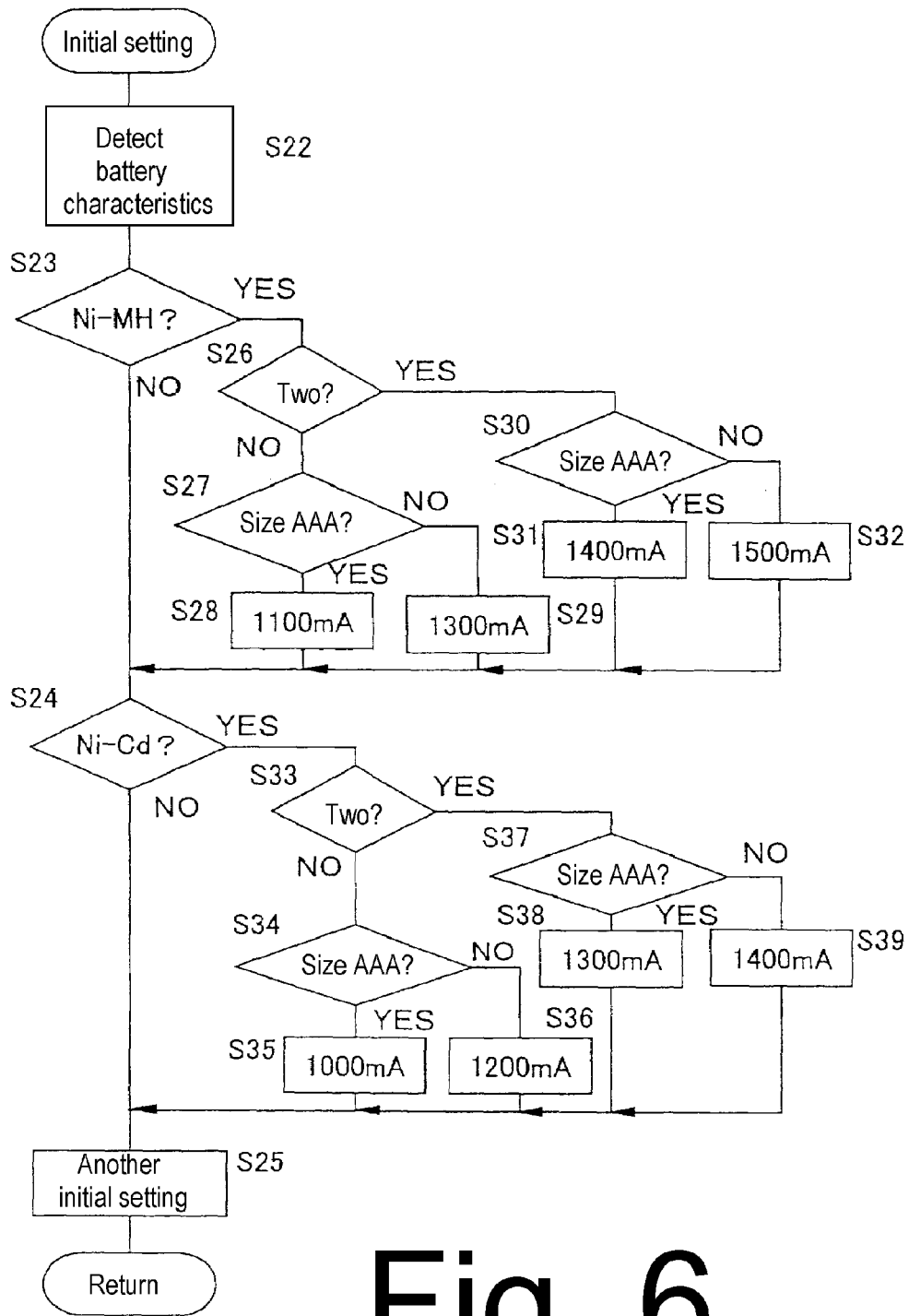
FIG. 6 is a flow chart of a particular embodiment of the initial setting routine in FIG. 5.

FIGS. 5 and 6 are flow charts of particular embodiments of routines executed by power supply control circuit 30b. As shown in FIG. 5, when a charged battery 22b is mounted to battery case 40, an initial setting routine shown in FIG. 6 is performed in a step S21. In step S22 of this initial setting routine, battery characteristics (e.g., kind, number and/or size) are obtained from battery characteristic detecting circuit 38. It is then determined in a step S23 whether or not battery 22b comprises a nickel-metal hydride (Ni—MH) battery. If so, it is then determined in a step S26 whether or not two such batteries are mounted in battery case 40. If so, it is then determined in a step S30 whether or not the batteries are size AAA. If so, then a maximum charging current provided by constant current circuit 24b is set to a value of 1400 mA in a step S31. Otherwise, it is assumed that AA size batteries are mounted in battery case 40, and the maximum charging current value is set to 1500 mA.

If it is determined in step S26 that two batteries are not mounted in battery case 40, then it is assumed that only one battery is mounted in battery case 40. It is then determined in a step S27 whether or not the batteries are size AAA. If so, then the maximum charging current value is set to 1100 mA in a step S28. Otherwise, it is assumed that AA size batteries are mounted in battery case 40, and the maximum charging current value is set to 1300 mA.

In any event, it is then determined in a step S24 whether or not battery 22b comprises a nickel-cadmium (Ni—Cd) battery. If so, it is then determined in a step S33 whether or not two such batteries are mounted in battery case 40. If so, it is then determined in a step S37 whether or not the batteries are size AAA. If so, then a maximum charging current value is set to 1300 mA in a step S38. Otherwise, it is assumed that AA size batteries are mounted in battery case 40, and the maximum charging current value is set to 1400 mA.

If it is determined in step S33 that two batteries are not mounted in battery case 40, then it is assumed that only one battery is mounted in battery case 40. It is then determined in a step S34 whether or not the batteries are size AAA. If so, then the maximum charging current value is set to 1000 mA in a step S35. Otherwise, it is assumed that AA size batteries are mounted in battery case 40, and the maximum charging current value is set to 1200 mA.

While not expressly described, similar procedures could be used to set charging current values for other battery characteristics, such as when battery 22b is a lithium-ion battery. In any event, other initial settings then are made in a step S25. Such initial settings include setting a minimum charging current Cs and a maximum discharging current Ds to predetermined values. At the same time, constant current circuit 24b and discharging switch 28a both are turned on. The process then returns to step S40 in the main routine in FIG. 5.

In step S40, power supply control circuit 30b obtains a detected charging current CA to battery 22b from charging current detecting circuit 34. It is then determined in a step S41 whether or not the detected charging current CA is less than the minimum charging current $C_s$ (thereby indicating that battery 22b may be in an overcharged state). If not, then further charging of battery 22b is allowable, and it is determined in a step S42 whether or not constant current circuit 24b already is turned on. If not (which would be the case if constant current circuit 24b was previously turned off because the charging current CA previously fell below the minimum charging current $C_s$), then constant current circuit 24b is turned on in a step S43. Otherwise, step S43 is skipped, and the process continues in step S46.

If it is determined in step S41 that the detected charging current CA is less than the minimum charging current $C_s$ (i.e., battery 22b may be in an overcharged state), then further charging of battery 22a is not allowed, and it is determined in a step S44 whether or not constant current circuit 24b already is turned off. If not (which would be the case if constant current circuit 24b previously was turned on because the charging current CA previously rose above the minimum charging current $C_s$), then constant current circuit 24b is turned off in a step S45. Otherwise, step S45 is skipped, and the process continues in step S46.

In any event, in step S46 the detected discharging current DA is obtained from discharging current detecting circuit 36. It is then determined in a step S47 whether or not the detected discharging current DA is greater than or equal to the maximum discharging current $D_s$ (thereby indicating that battery 22b may be in an excessively discharged state, or else there is a short-circuit in the system). If not, then further communication of power from battery 22b to electrical device 14 is allowable, and it is determined in a step S48 whether or not discharging switch 28a already is turned on. If not (which would be the case if discharging switch 28a was previously turned off because the discharging current previously rose above the maximum discharging current $D_s$), then discharging switch 28a is turned on in a step S49. Otherwise, step S49 is skipped, and the process returns to step S40.

If it is determined in step S47 that the discharging current DA is greater than or equal to the maximum discharging current $D_s$ (i.e., battery 22b may be in an excessively discharged state, or else there is a short-circuit in the system), then further draining of battery 22b is not allowed, and it is determined in a step S50 whether or not discharging switch 28a already is turned off. If not (which would be the case if discharging switch 28a was previously turned on because the discharging current DA previously fell below the maximum discharging current $D_s$), then the process moves to step S51, and discharging switch 28a is turned off. Otherwise, the process returns to step S40.

As a result of this process, a condition of battery 22b easily can be detected by detecting the charging and discharging currents CA and DA, respectively. When the charging current CA is too low, it is determined that the battery may be overcharged, and constant current circuit 24b is turned off to cut off charging current input to battery 22b. On the other hand, when the discharging current DA is too high, it is determined that the battery may be excessively discharged, and discharging switch 28a is turned off to prevent further discharging of battery 22b. Accordingly, battery 22b can be protected, and the risk of decreased battery life can be minimized.

Figure 7:
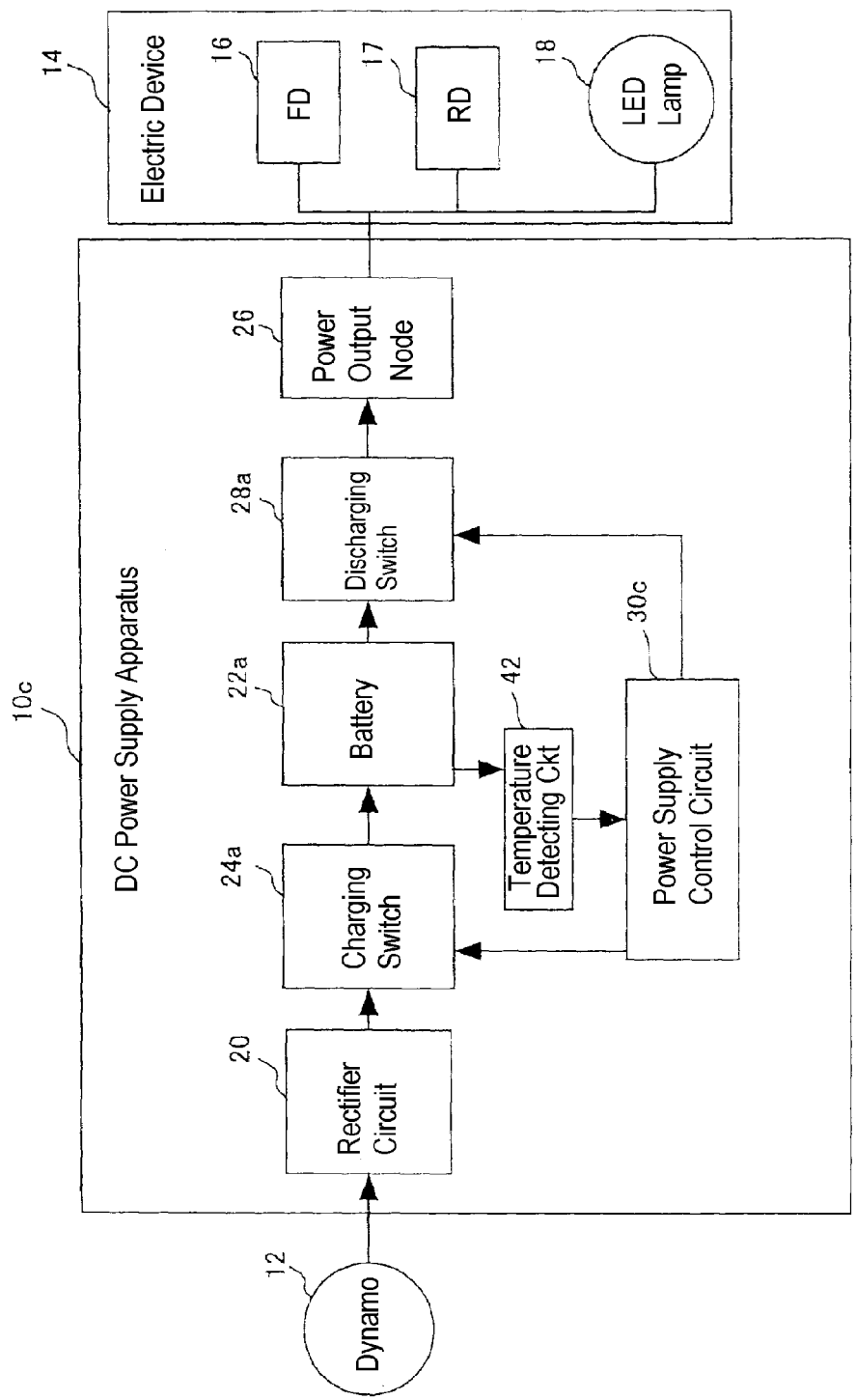
FIG. 7 is a block diagram of another embodiment of a DC power supply apparatus.

FIG. 7 is a block diagram of another embodiment of a DC power supply apparatus 10c. Components that are essentially the same as those shown in FIG. 2 are numbered the same and will not be described in detail. In this embodiment, DC power supply apparatus 10c comprises rectifier circuit 20, battery 22a, charging switch 24a, power output node 26, discharging switch 28a, a power supply control circuit 30c, and a temperature detecting circuit 42. Temperature detecting circuit 42 may comprise, for example, a semiconductor temperature detecting element, such as a thermistor, or some other temperature detecting element. In general, when the battery temperature is too high, it is determined that the battery may be overcharged, and charging switch 24a and discharging switch 28a are turned off to cut off current to and from battery 22a.

Figure 8:
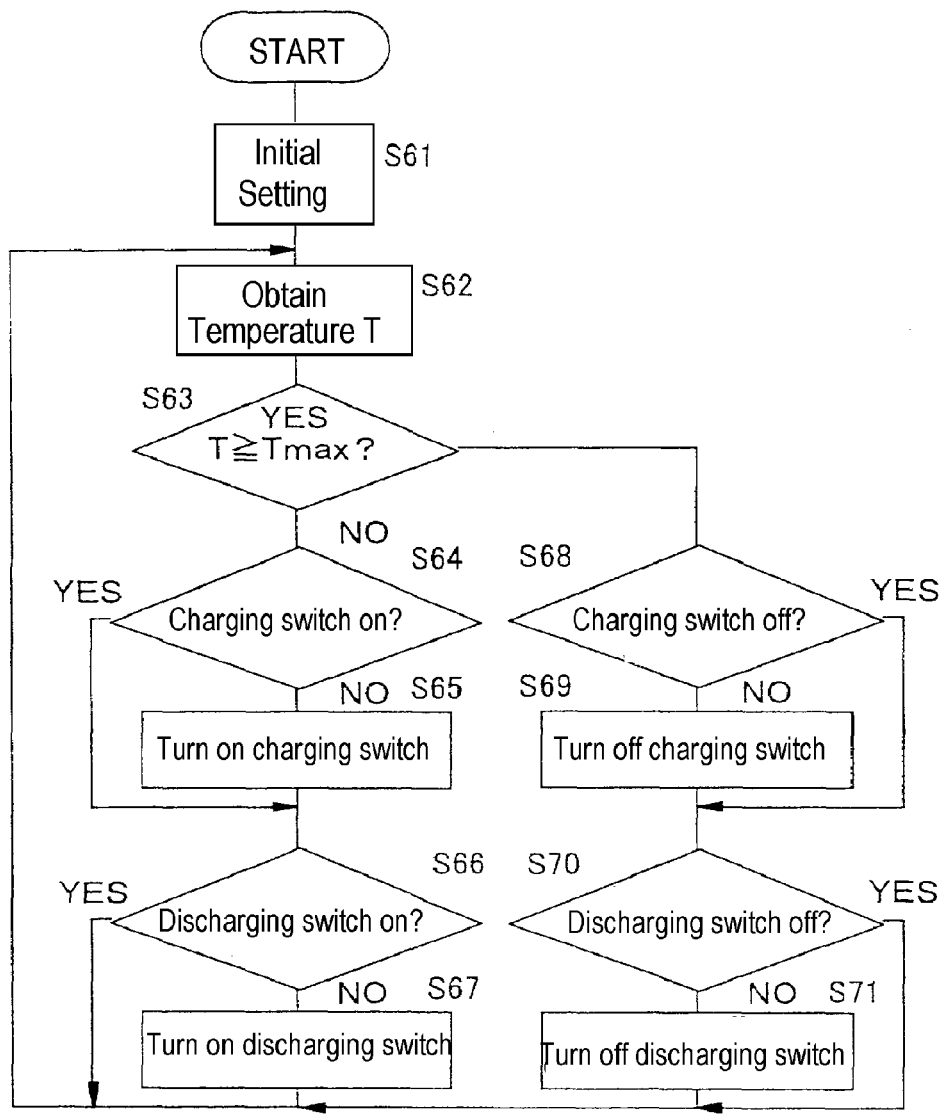
FIG. 8 is a flow chart of a particular embodiment of a routine executed by the power supply control circuit in FIG. 7.

FIG. 8 is a flow chart of a particular embodiment of a routine executed by power supply control circuit 30c. When a charged battery 22a is mounted in DC power supply apparatus 10c, an initial setting is performed in a step S61. In this initial step, a maximum temperature $T_{max}$ for detecting an overcharged state of battery 22a is set to a predetermined value. Additionally, charging switch 24a and discharging switch 28a both are turned on. In step S62, power supply control circuit 30c obtains a detected temperature T of battery 22a from temperature detecting circuit 42.

It is then determined in a step S63 whether or not the detected battery temperature T is greater than or equal to the maximum temperature $T_{max}$ (i.e., battery 22a may be in an overcharged state). If not, then further charging and discharging of battery 22a is allowable, and it is determined in a step S64 whether or not charging switch 24a already is turned on. If not, then charging switch 24a is turned on in a step S65. Otherwise, step S65 is skipped. It is then determined in a step S66 whether or not discharging switch 28a already is turned on. If not, then discharging switch 28a is turned on in a step S67. Otherwise, step S67 is skipped, and the process returns to step S62.

If it is determined in step S63 that the detected battery temperature T is greater than or equal to the maximum temperature $T_{max}$ (i.e., battery 22a may be in an overcharged state), then further charging and discharging of battery 22a is not allowed, and it is determined in a step S68 whether or not charging switch 24a already is turned off. If not, then charging switch 24a is turned off in a step S69. Otherwise, step S69 is skipped. It is then determined in a step S70 whether or not discharging switch 28a already is turned off. If not, then discharging switch 28a is turned off in a step S71. Otherwise, step S71 is skipped, and the process returns to step S62. In other embodiments, discharging switch 28a may be turned on to allow discharging battery 22a to alleviate the overcharged condition.

Figure 9:
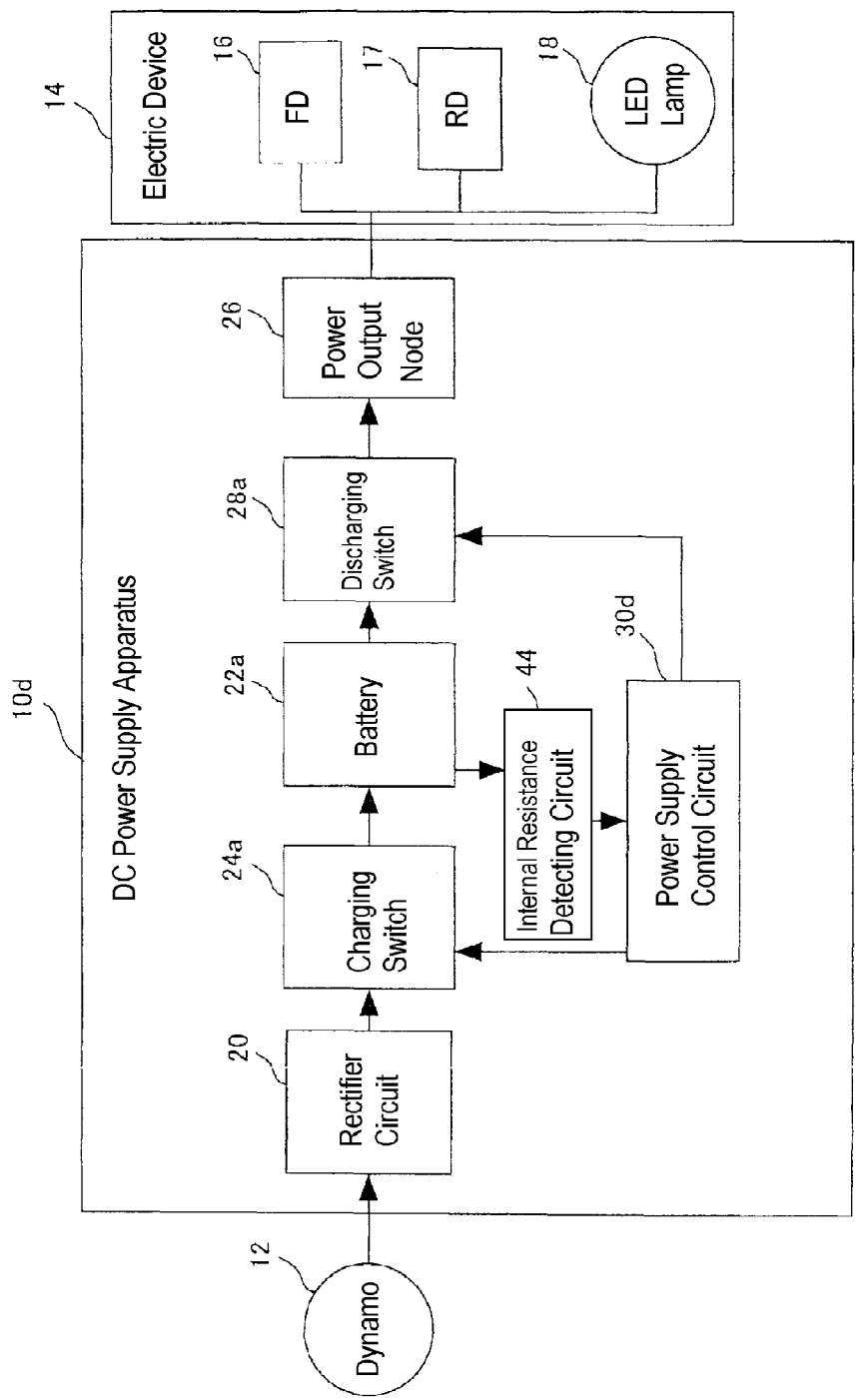
FIG. 9 is a block diagram of another embodiment of a DC power supply apparatus.

FIG. 9 is a block diagram of another embodiment of a DC power supply apparatus 10d. Components that are essentially the same as those shown in FIG. 2 are numbered the same and will not be described in detail. In this embodiment, DC power supply apparatus 10d comprises rectifier circuit 20, battery 22a, charging switch 24a, power output node 26, discharging switch 28a, a power supply control circuit 30d, and an internal resistance detecting circuit 44. Internal resistance detecting circuit 44 may detect the internal resistance of battery 22a, for example, by varying the charging current in a short period of time and taking voltage and current measurements at two different times.

Figure 10:
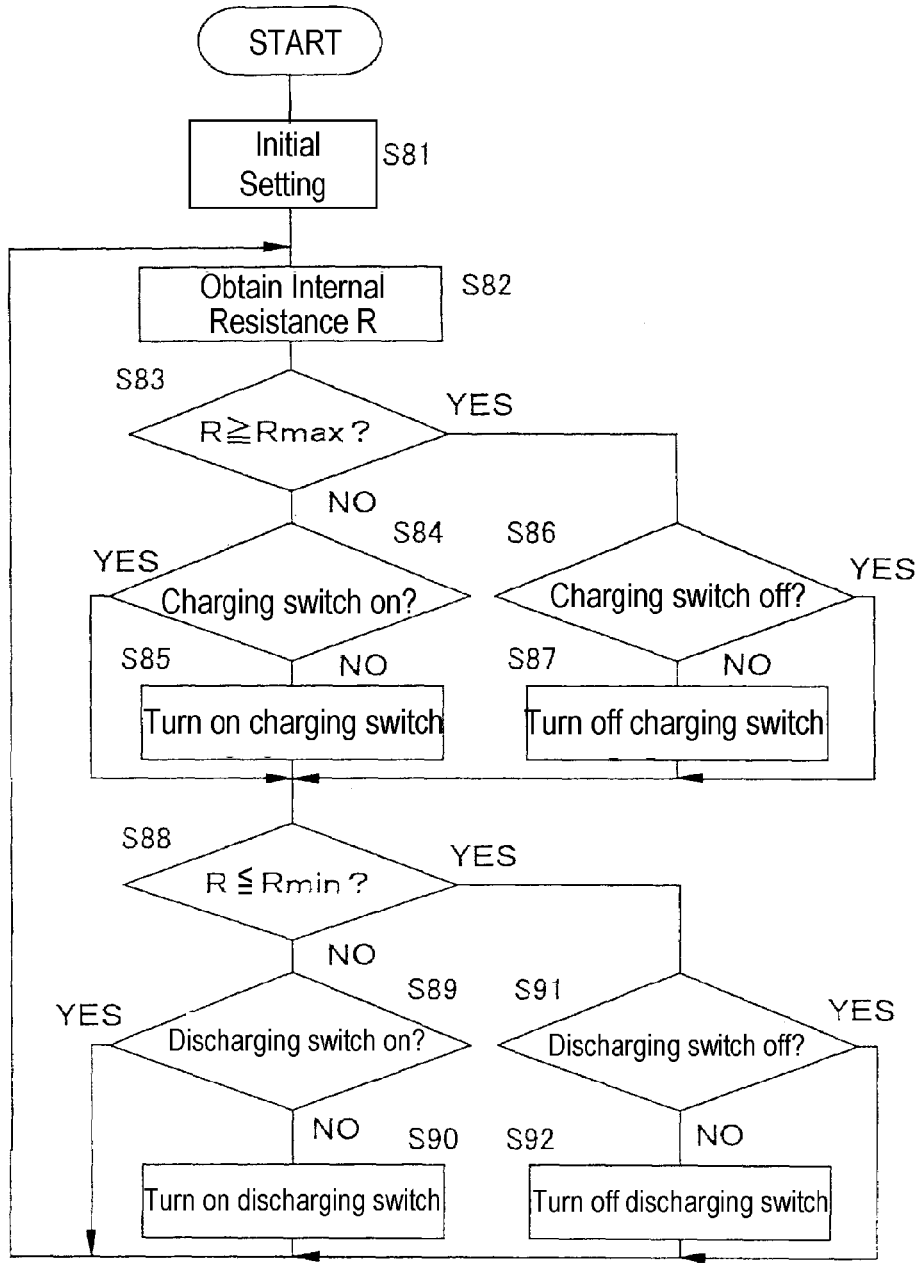
FIG. 10 is a flow chart of a particular embodiment of a routine executed by the power supply control circuit in FIG. 9.

FIG. 10 is a flow chart of a particular embodiment of a routine executed by power supply control circuit 30d. When a charged battery 22a is mounted in DC power supply apparatus 10d, an initial setting is performed in a step S81. In this initial step, a maximum internal resistance $R_{max}$ for detecting an overcharged state of battery 22a and a minimum internal resistance $R_{min}$ for detecting an excessively discharged state of battery 22a are set to predetermined values. Additionally, charging switch 24a and discharging switch 28a both are turned on. In step S82, power supply control circuit 30d obtains a detected internal resistance R of battery 22a from internal resistance detecting circuit 44.

It is then determined in a step S83 whether or not the detected internal resistance R is greater than or equal to the maximum internal resistance $R_{max}$ (i.e., battery 22a may be in an overcharged state). If not, then further charging of battery 22a is allowable, and it is determined in a step S84 whether or not charging switch 24a already is turned on. If not, then charging switch 24a is turned on in a step S85. Otherwise, step S85 is skipped, and the process continues in step S88.

If it is determined in step S83 that the detected internal resistance R is greater than or equal to the maximum internal resistance $R_{max}$ (i.e., battery 22a may be in an overcharged state), then further charging of battery 22a is not allowed, and it is determined in a step S86 whether or not charging switch 24a already is turned off. If not, then charging switch 24a is turned off in a step S87. Otherwise, step S87 is skipped, and the process continues in step S88.

In any event, it is then determined in step S88 whether or not the detected internal resistance R is less than or equal to the minimum internal resistance $R_{min}$ (i.e., battery 22a may be in an excessively discharged state). If not, then further communication of power from battery 22a to electrical device 14 is allowable, and it is determined in a step S89 whether or not discharging switch 28a already is turned on. If not, then discharging switch 28a is turned on in a step S90. Otherwise, step S90 is skipped, and the process returns to step S82.

If it is determined in step S88 that the detected internal resistance R is less than or equal to the minimum internal resistance $R_{min}$ (i.e., battery 22a may be in an excessively discharged state), then further draining of battery 22a is not allowed, and it is determined in a step S91 whether or not discharging switch 28a already is turned off. If not, then discharging switch 28a is turned off in a step S92. Otherwise, step S92 is skipped, and the process returns to step S82.

Figure 11:
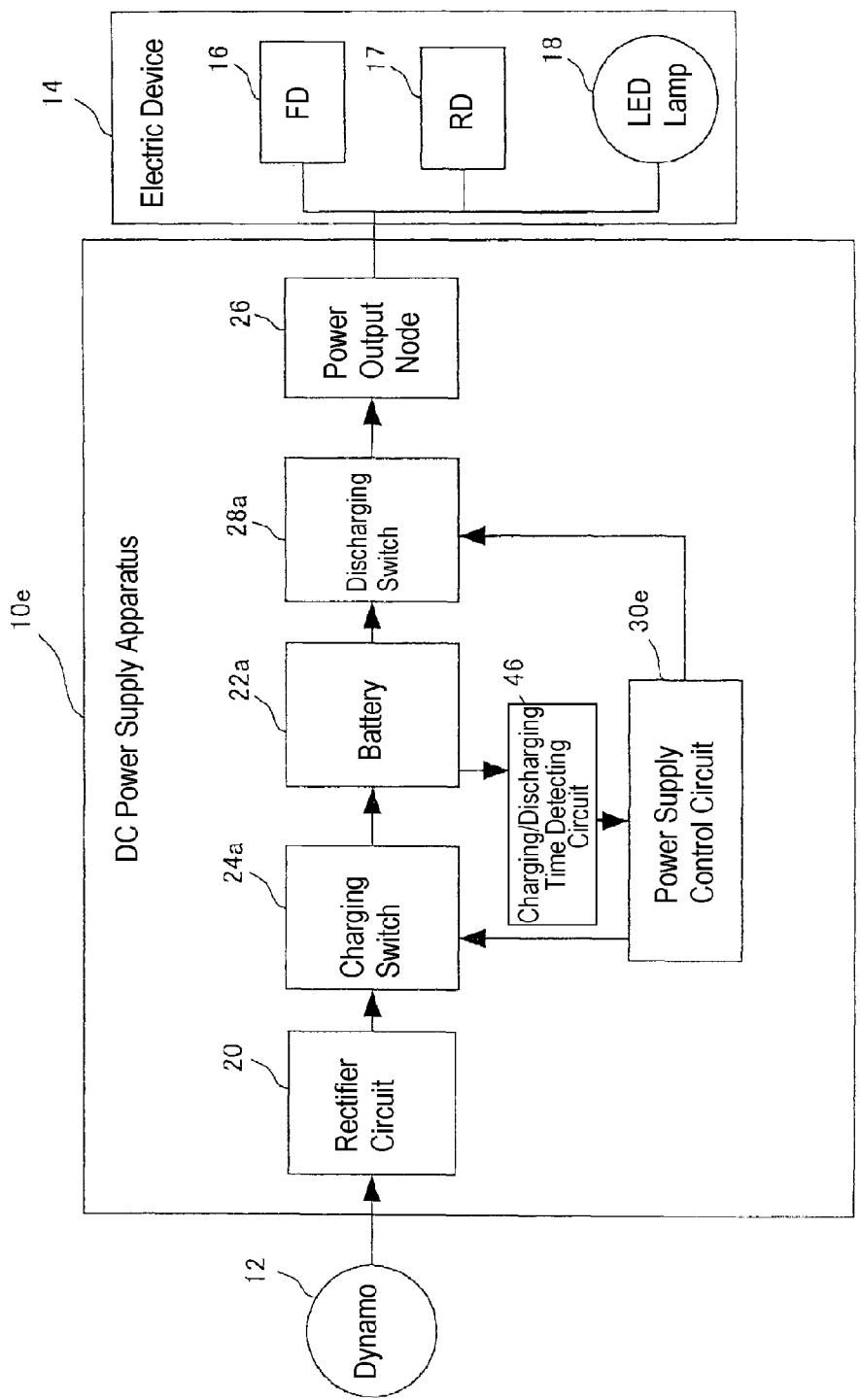
FIG. 11 is a block diagram of another embodiment of a DC power supply apparatus.

FIG. 11 is a block diagram of another embodiment of a DC power supply apparatus 10e. Components that are essentially the same as those shown in FIG. 2 are numbered the same and will not be described in detail. In this embodiment, DC power supply apparatus 10e comprises rectifier circuit 20, battery 22a, charging switch 24a, power output node 26, discharging switch 28a, a power supply control circuit 30e, and a charging/discharging time detecting circuit 46.

Figure 12:
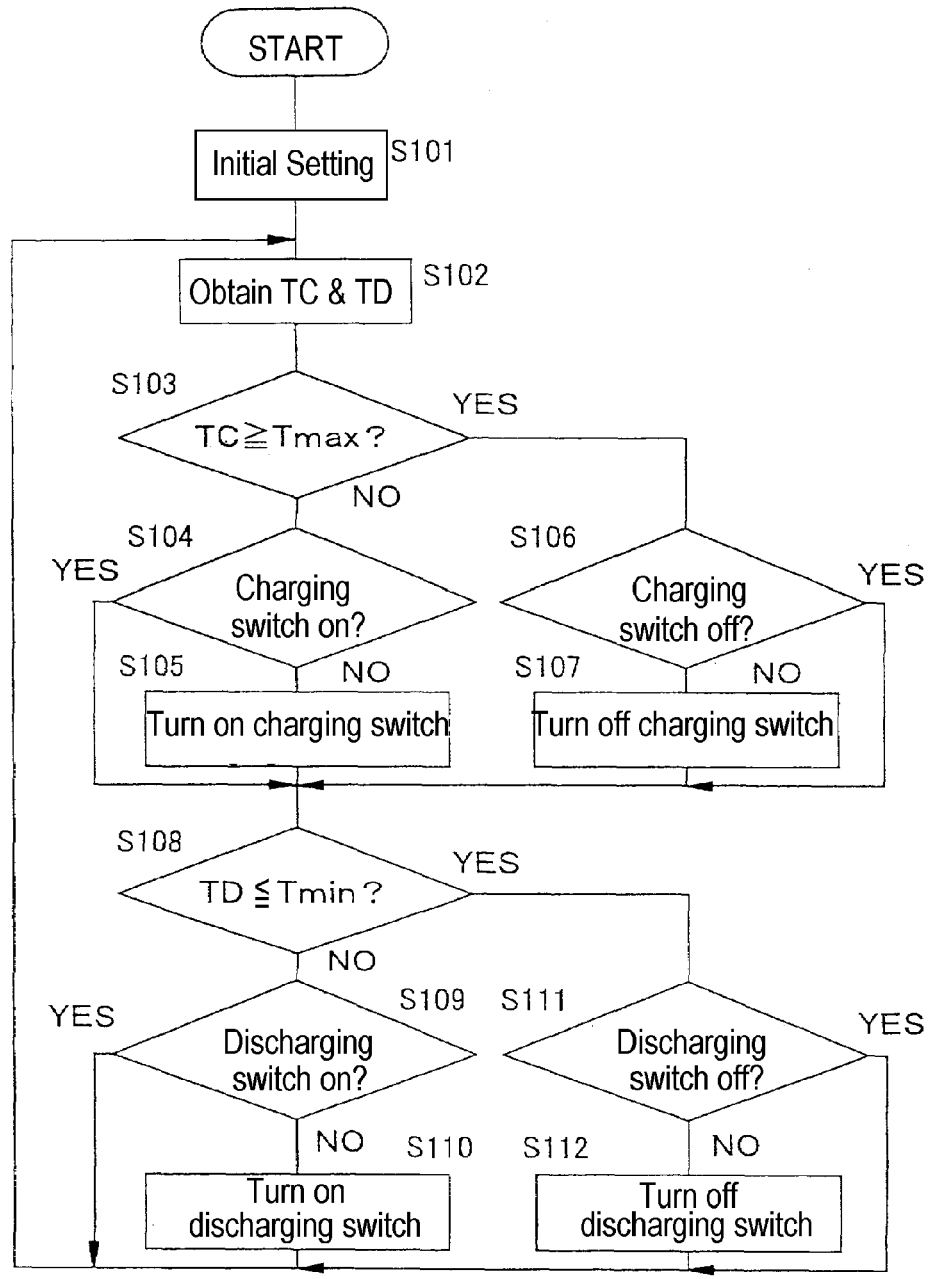
FIG. 12 is a flow chart of a particular embodiment of a routine executed by the power supply control circuit in FIG. 11.

FIG. 12 is a flow chart of a particular embodiment of a routine executed by power supply control circuit 30e. When a charged battery 22a is mounted in DC power supply apparatus 10e, an initial setting is performed in a step S101. In this initial step, a maximum charging time $T_{max}$ for detecting an overcharged state of battery 22a and a minimum discharging time $T_{min}$ for detecting an excessively discharged state of battery 22a are set to predetermined values. Additionally, charging switch 24a and discharging switch 28a both are turned on. In step S102, power supply control circuit 30e obtains the detected charging time TC and discharging time TD of battery 22a from charging/discharging time detecting circuit 46.

It is then determined in a step S103 whether or not the detected charging time TC is greater than or equal to the maximum charging time $T_{max}$ (i.e., battery 22a may be in an overcharged state). If not, then further charging of battery 22a is allowable, and it is determined in a step S104 whether or not charging switch 24a already is turned on. If not, then charging switch 24a is turned on in a step S105. Otherwise, step S105 is skipped, and the process continues in step S108.

If it is determined in step S103 that the detected charging time TC is greater than or equal to the maximum charging time $T_{max}$ (i.e., battery 22a may be in an overcharged state), then further charging of battery 22a is not allowed, and it is determined in a step S106 whether or not charging switch 24a already is turned off. If not, then charging switch 24a is turned off in a step S107. Otherwise, step S107 is skipped, and the process continues in step S108.

In any event, it is then determined in step S108 whether or not the detected discharging time TD is less than or equal to the minimum discharging time $T_{min}$ (i.e., battery 22a may be in an excessively discharged state). If not, then further communication of power from battery 22a to electrical device 14 is allowable, and it is determined in a step S109 whether or not discharging switch 28a already is turned on. If not, then discharging switch 28a is turned on in a step S110. Otherwise, step S110 is skipped, and the process returns to step S102.

If it is determined in step S108 that the detected discharging time TD is less than or equal to the minimum discharging time $T_{min}$ (i.e., battery 22a may be in an excessively discharged state), then further draining of battery 22a is not allowed, and it is determined in a step S111 whether or not discharging switch 28a already is turned off. If not, then discharging switch 28a is turned off in a step S112. Otherwise, step S112 is skipped, and the process returns to step S102.

Figure 13:
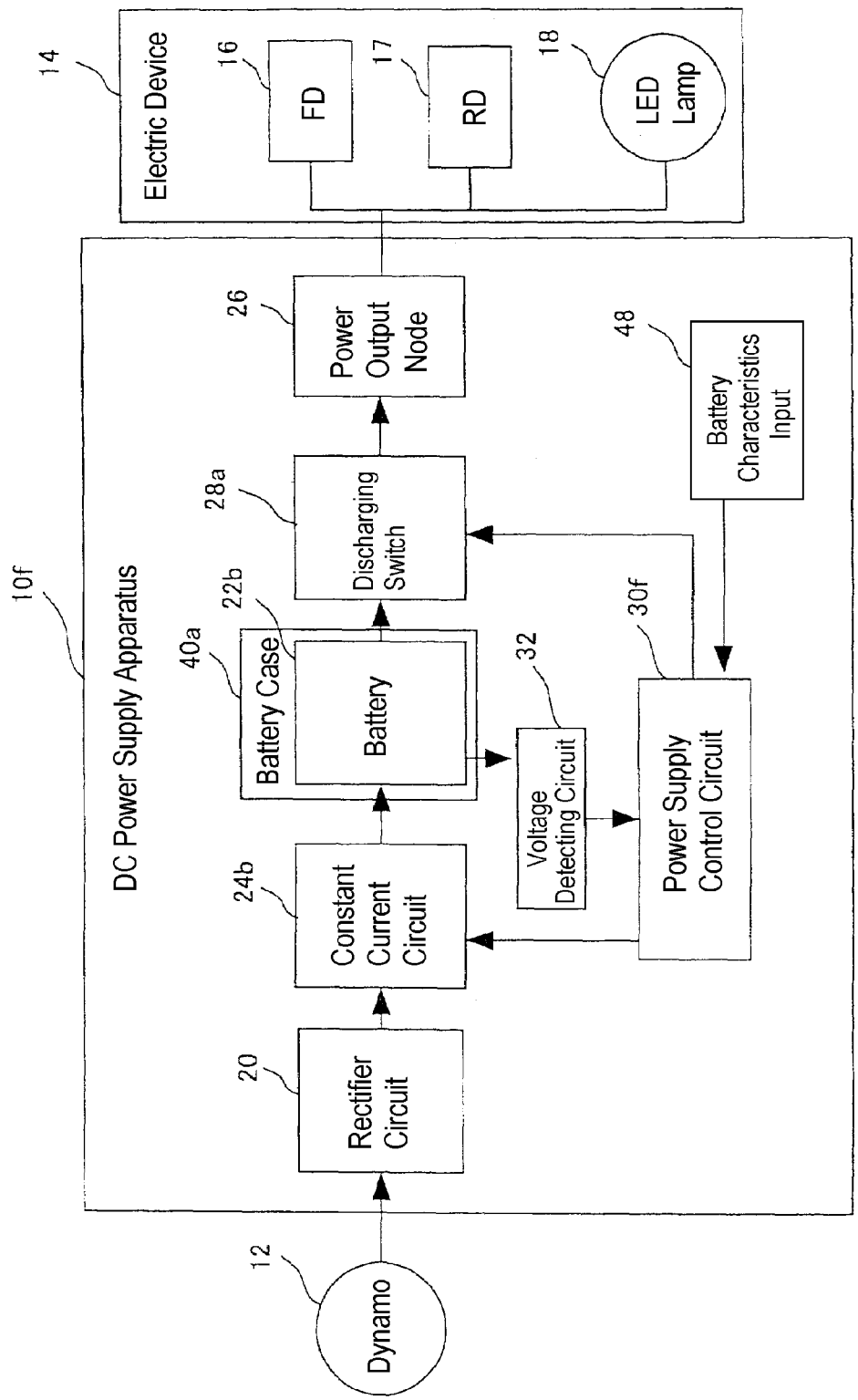
FIG. 13 is a block diagram of another embodiment of a DC power supply apparatus.

FIG. 13 is a block diagram of another embodiment of a DC power supply apparatus 10f. Components that are essentially the same as those shown in FIG. 4 are numbered the same and will not be described in detail. In this embodiment, DC power supply apparatus 10f comprises rectifier circuit 20, a battery 22b mounted at a battery case 40a, constant current circuit 24b, power output node 26, discharging switch 28a, a power supply control circuit 30f, voltage detecting circuit 32, and a battery characteristic input circuit 48.

As in the embodiment shown in FIG. 4, battery 22b may be, for example, one or more commercially available size AA or AAA batteries, such as a lithium-ion battery, a nickel-cadmium battery or a nickel-metal hydride battery that may be detachably mounted to battery case 40a. Battery characteristic input circuit 48 is used to indicate one or more characteristics of battery 22b. For example, battery characteristic input circuit 48 may include an on/off switch, wherein a nickel-cadmium battery is indicated when the switch is turned on, and a nickel-metal hydride battery is indicated when the switch is turned off. A rotary switch or multiple binary switches may be used when more than three kinds of batteries are possible.

Figure 14:
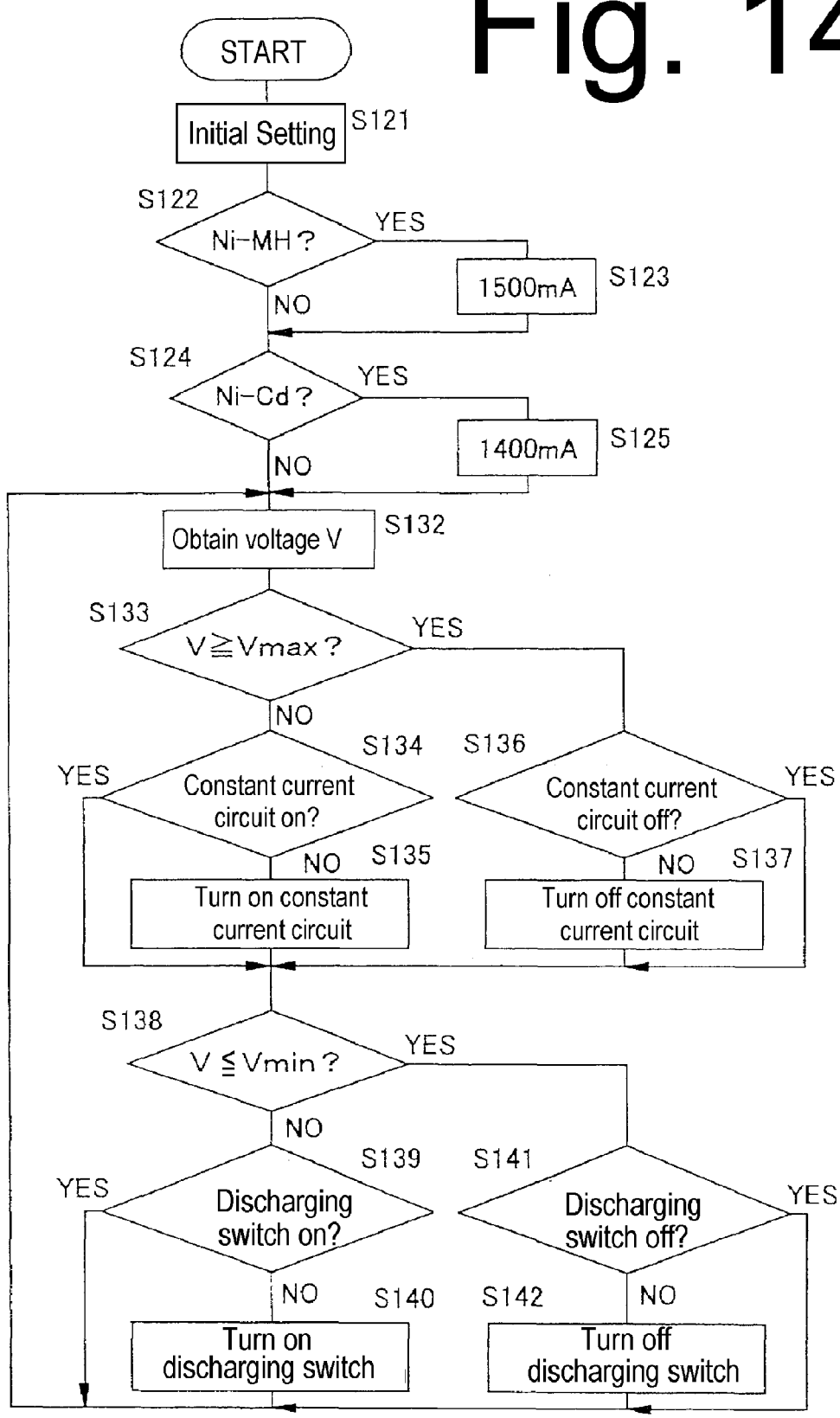
FIG. 14 is a flow chart of a particular embodiment of a routine executed by the power supply control circuit in FIG. 13.

FIG. 14 is a flow chart of a particular embodiment of a routine executed by power supply control circuit 30f. When a charged battery 22b is mounted in DC power supply apparatus 10f, an initial setting is performed in a step S121. In this initial step, a maximum voltage $V_{max}$ for detecting an overcharged state of battery 22b and a minimum voltage $V_{min}$ for detecting an excessively discharged state of battery 22b are set to predetermined values. Constant current circuit 24b and discharging switch 28a both may be turned on at this time.

It is then determined in a step S122 based on signals from battery characteristic input circuit 48 whether or not a nickel-metal hydride battery is mounted in battery case 40a. If so, then constant current circuit 24b is set to provide a maximum charging current of 1500 mA in a step S123. In any event, it is then determined in a step S124 whether or not a nickel-cadmium battery is mounted in battery case 40a. If so, then constant current circuit 24b is set to provide a maximum charging current of 1400 mA in a step S125.

In any event, power supply control circuit 30f obtains the detected voltage V of battery 22b from voltage detecting circuit 32 in a step S132. It is then determined in a step S133 whether or not the detected battery voltage V is greater than or equal to the maximum voltage $V_{max}$ (i.e., battery 22b may be in an overcharged state). If not, then further charging of battery 22b is allowable, and it is determined in a step S134 whether or not constant current circuit 24b already is turned on. If not, then constant current circuit 24b is turned on in a step S135. Otherwise, step S135 is skipped, and the process continues in step S138.

If it is determined in step S133 that the detected battery voltage V is greater than or equal to the maximum voltage $V_{max}$ (i.e., battery 22b may be in an overcharged state), then further charging of battery 22b is not allowed, and it is determined in a step S136 whether or not constant current circuit 24b already is turned off. If not, then constant current circuit 24b is turned off in a step S137. Otherwise, step S137 is skipped, and the process continues in step S138.

In any event, it is then determined in step S138 whether or not the detected battery voltage V is less than or equal to the minimum voltage $V_{min}$ (i.e., battery 22b may be in an excessively discharged state). If not, then further communication of power from battery 22b to electrical device 14 is allowable, and it is determined in a step S139 whether or not discharging switch 28a already is turned on. If not (which would be the case if discharging switch 28a previously was turned off because the battery voltage V previously fell below the minimum voltage $V_{min}$), then discharging switch 28a is turned on in a step S140. Otherwise, step S140 is skipped, and the process returns to step S132.

If it is determined in step S138 that the detected battery voltage V is less than or equal to the minimum voltage $V_{min}$ (i.e., battery 22b may be in an excessively discharged state), then further draining of battery 22b is not allowed, and it is determined in a step S141 whether or not discharging switch 28a already is turned off. If not, then discharging switch 28a is turned off in a step S142. Otherwise, step S142 is skipped, and the process returns to step S132.

Figure 15:
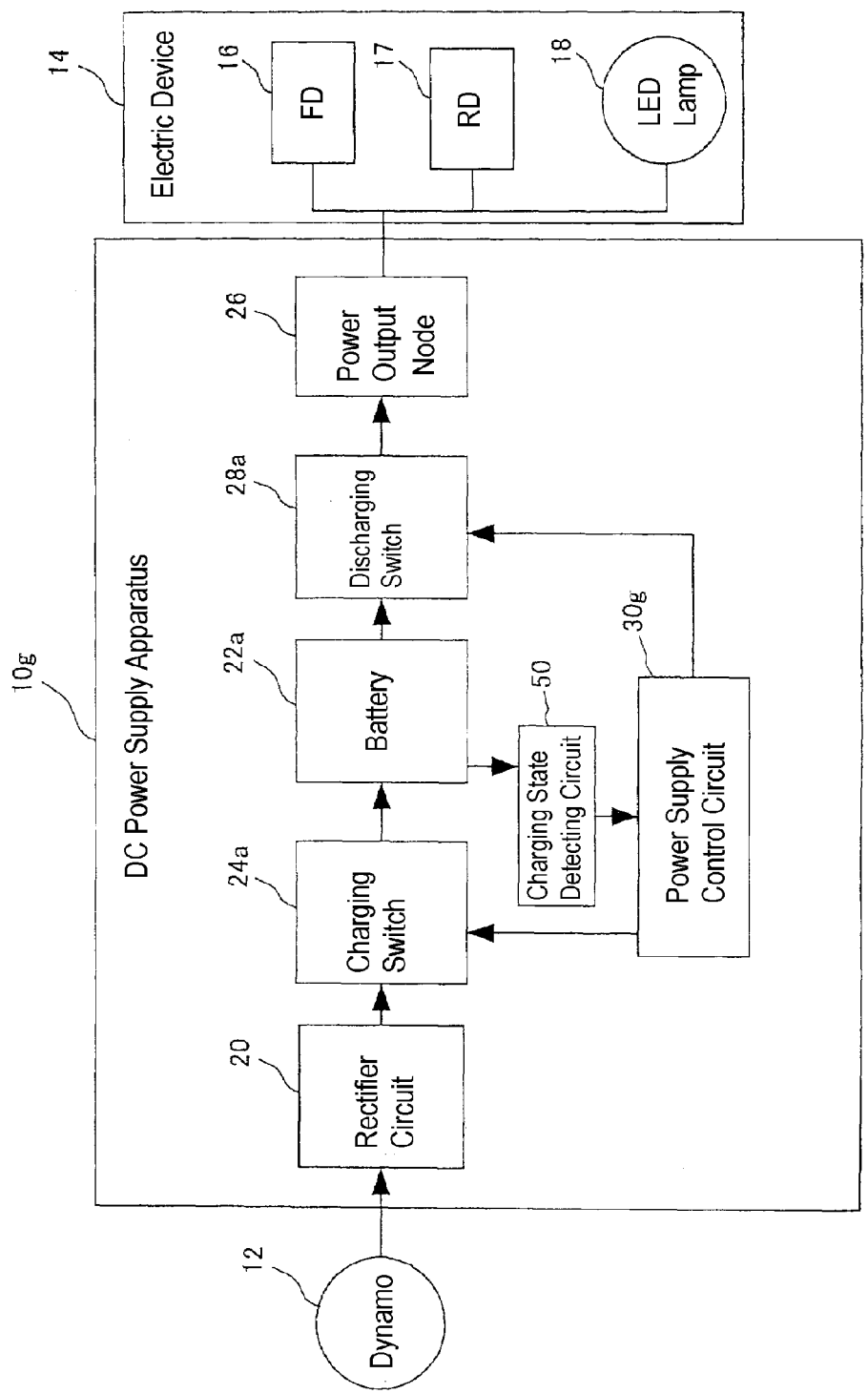
FIG. 15 is a block diagram of another embodiment of a DC power supply apparatus.

FIG. 15 is a block diagram of another embodiment of a DC power supply apparatus 10g. Components that are essentially the same as those shown in FIG. 2 are numbered the same and will not be described in detail. In this embodiment, DC power supply apparatus 10g comprises rectifier circuit 20, battery 22a, charging switch 24a, power output node 26, discharging switch 28a, a power supply control circuit 30g, and a charge state detecting circuit 50. Thus, in this embodiment, the charge state of battery 50 is detected directly.

Figure 16:
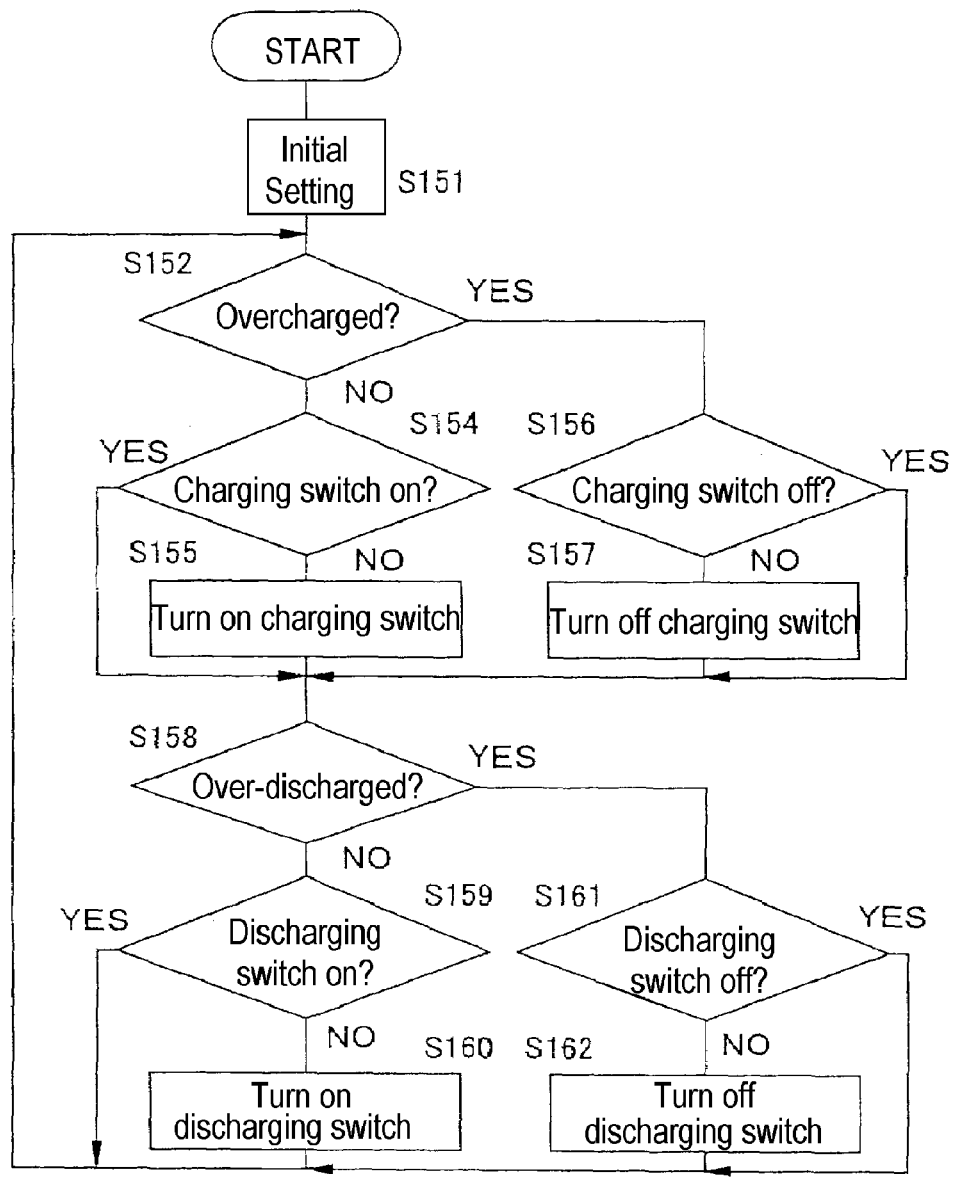
FIG. 16 is a flow chart of a particular embodiment of a routine executed by the power supply control circuit in FIG. 15.

FIG. 16 is a flow chart of a particular embodiment of a routine executed by power supply control circuit 30g. When a charged battery 22a is mounted in DC power supply apparatus 10g, an initial setting is performed in a step S151. In this initial step, flags indicating an overcharged state and an excessively discharged state of battery 22a each are reset. Also, charging switch 24a and discharging switch 28a both are turned on.

It is then determined in a step S152 whether or not battery 22a is in an overcharged state. If not, then further charging of battery 22a is allowable, and it is determined in a step S155 whether or not charging switch 24a already is turned on. If not, then charging switch 24a is turned on in a step S155. Otherwise, step S155 is skipped, and the process continues in step S158. On the other hand, if it is determined in step S152 that battery 22a is in an overcharged state, then further charging of battery 22a is not allowed, and it is determined in a step S156 whether or not charging switch 24a already is turned off. If not, then charging switch 24a is turned off in a step S157. Otherwise, step S157 is skipped, and the process continues in step S158.

In any event, it is then determined in step S158 whether or not battery 22a is in an excessively discharged state. If not, then further communication of power from battery 22a to electrical device 14 is allowable, and it is determined in a step S159 whether or not discharging switch 28a already is turned on. If not, then discharging switch 28a is turned on in a step S160. Otherwise, step S160 is skipped, and the process returns to step S152. On the other hand, if it is determined in step S158 that 22a is in an excessively discharged state, then further draining of battery 22a is not allowed, and it is determined in a step S161 whether or not discharging switch 28a already is turned off. If not, then discharging switch 28a is turned off in a step S162. Otherwise, step S162 is skipped, and the process returns to step S152.

While the above is a description of various embodiments of inventive features, further modifications may be employed without departing from the spirit and scope of the present invention. For example, while the disclosed constant current circuits provided a charging current suitable to charge a particular battery, the charging current could be set to a small value (e.g., approximately 100 mA), in which case the battery may be charged at all times independently of the maximum and minimum voltages of the battery. The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. For example, while an overcharged state and an excessively discharged state of a power storage element were determined by use of one parameter such as voltage or current, the state of the power storage element may be determined using a combination of parameters described in any of the embodiments. The structures and functions of one embodiment may be adopted in another embodiment. For example, while a constant current circuit was used to adjust charging current to the power storage element, a constant current circuit may be used to adjust discharging current from the power storage element. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A DC power supply apparatus for controlling current flow to and from a rechargeable power storage element for a human powered vehicle, wherein the apparatus comprises:
   a rectifier circuit that converts AC current from an alternating current generator into a DC current;
   an input current adjusting circuit that receives current from the rectifier circuit and adjusts current flow from the rectifier circuit to the power storage element;
   an output current adjusting circuit that receives current from the power storage element and adjusts current flow from the power storage element to an output node; and
   a control circuit that operates at least one of the input current adjusting circuit and the output current adjusting circuit based on a predetermined condition of the power storage element;
   wherein at least one of the input current adjusting circuit and the output current adjusting circuit comprises a current limiting circuit that limits current to a predetermined value.

2. The apparatus according to claim 1 wherein at least one of the input current adjusting circuit and the output current adjusting circuit comprises a constant current circuit.

3. The apparatus according to claim 1 further comprising a characteristic input circuit to designate a characteristic of the power storage element, wherein the control circuit operates the current limiting circuit based on a characteristic of the power storage element.

4. A DC power supply apparatus for controlling current flow to and from a rechargeable power storage element for a human powered vehicle, wherein the apparatus comprises:
   a rectifier circuit that converts AC current from an alternating current generator into a DC current;
   an input current adjusting circuit that receives current from the rectifier circuit and adjusts current flow from the rectifier circuit to the power storage element;
   an output current adjusting circuit that receives current from the power storage element and adjusts current flow from the power storage element to an output node;
   a control circuit that operates at least one of the input current adjusting circuit and the output current adjusting circuit based on a predetermined condition of the power storage element; and
   a current detecting circuit that detects current flowing from the rectifier circuit to the power storage element, wherein the control circuit operates at least one of the input current adjusting circuit and the output current adjusting circuit based on detected current flowing from the rectifier circuit to the power storage element.

5. The apparatus according to claim 4 wherein the control circuit operates the input current adjusting circuit based on detected current flowing from the rectifier circuit to the power storage element.

6. A DC power supply apparatus for controlling current flow to and from a rechargeable power storage element for a human powered vehicle, wherein the apparatus comprises:
   a rectifier circuit that converts AC current from an alternating current generator into a DC current;
   an input current adjusting circuit that receives current from the rectifier circuit and adjusts current flow from the rectifier circuit to the power storage element;
   an output current adjusting circuit that receives current from the power storage element and adjusts current flow from the power storage element to an output node;
   a control circuit that operates at least one of the input current adjusting circuit and the output current adjusting circuit based on a predetermined condition of the power storage element; and
   a current detecting circuit that detects current flowing from the power storage element to the output node, wherein the control circuit operates at least one of the input current adjusting circuit and the output current adjusting circuit based on detected current flowing from the power storage element to the output node.

7. The apparatus according to claim 6 wherein the control circuit operates the output current adjusting circuit based on detected current flowing from the power storage element to the output node.

8. A DC power supply apparatus for controlling current flow to and from a rechargeable power storage element for a human powered vehicle, wherein the apparatus comprises:
   a rectifier circuit that converts AC current from an alternating current generator into a DC current;
   an input current adjusting circuit that receives current from the rectifier circuit and adjusts current flow from the rectifier circuit to the power storage element;
   an output current adjusting circuit that receives current from the power storage element and adjusts current flow from the power storage element to an output node;
   a control circuit that operates at least one of the input current adjusting circuit and the output current adjusting circuit based on a predetermined condition of the power storage element; and
   a temperature detecting circuit that detects a temperature arising from the power storage element, wherein the control circuit operates at least one of the input current adjusting circuit and the output current adjusting circuit based on detected temperature arising from the power storage element.

9. A DC power supply apparatus for controlling current flow to and from a rechargeable power storage element for a human powered vehicle, wherein the apparatus comprises:
   a rectifier circuit that converts AC current from an alternating current generator into a DC current;
   an input current adjusting circuit that receives current from the rectifier circuit and adjusts current flow from the rectifier circuit to the power storage element;
   an output current adjusting circuit that receives current from the power storage element and adjusts current flow from the power storage element to an output node;
   a control circuit that operates at least one of the input current adjusting circuit and the output current adjusting circuit based on a predetermined condition of the power storage element; and
   a resistance detecting circuit that detects a resistance of the power storage element, wherein the control circuit operates at least one of the input current adjusting circuit and the output current adjusting circuit based on detected resistance of the power storage element.

10. A DC power supply apparatus for controlling current flow to and from a rechargeable power storage element for a human powered vehicle, wherein the apparatus comprises:
   a rectifier circuit that converts AC current from an alternating current generator into a DC current;
   an input current adjusting circuit that receives current from the rectifier circuit and adjusts current flow from the rectifier circuit to the power storage element;
   an output current adjusting circuit that receives current from the power storage element and adjusts current flow from the power storage element to an output node;
   a control circuit that operates at least one of the input current adjusting circuit and the output current adjusting circuit based on a predetermined condition of the power storage element; and a charging time detecting circuit that detects a charging time of the power storage element, wherein the control circuit operates at least one of the input current adjusting circuit and the output current adjusting circuit based on detected charging time of the power storage element.

11. The apparatus according to claim 10 wherein the control circuit operates the input current adjusting circuit based on detected charging time of the power storage element.

12. A DC power supply apparatus for controlling current flow to and from a rechargeable power storage element for a human powered vehicle, wherein the apparatus comprises:
  a rectifier circuit that converts AC current from an alternating current generator into a DC current;
  an input current adjusting circuit that receives current from the rectifier circuit and adjusts current flow from the rectifier circuit to the power storage element;
  an output current adjusting circuit that receives current from the power storage element and adjusts current flow from the power storage element to an output node;
  a control circuit that operates at least one of the input current adjusting circuit and the output current adjusting circuit based on a predetermined condition of the power storage element; and
  a discharging time detecting circuit that detects a discharging time of the power storage element, wherein the control circuit operates at least one of the input current adjusting circuit and the output current adjusting circuit based on detected discharging time of the power storage element.

13. The apparatus according to claim 12 wherein the control circuit operates the output current adjusting circuit based on detected discharging time of the power storage element.

14. A DC power supply apparatus for controlling current flow to and from a rechargeable power storage element for a human powered vehicle, wherein the apparatus comprises:
  a rectifier circuit that converts AC current from an alternating current generator into a DC current;
  an input current adjusting circuit that receives current from the rectifier circuit and adjusts current flow from the rectifier circuit to the power storage element;
  an output current adjusting circuit that receives current from the power storage element and adjusts current flow from the power storage element to an output node;
  a control circuit that operates at least one of the input current adjusting circuit and the output current adjusting circuit based on a predetermined condition of the power storage element; and
  a characteristic detecting circuit that detects a characteristic of the power storage element, wherein the control circuit operates at least one of the input current adjusting circuit and the output current adjusting circuit based on the characteristic of the power storage element.

15. The apparatus according to claim 14 wherein the control circuit operates at least one of the input current adjusting circuit and the output current adjusting circuit based on a kind of the power storage element.

16. The apparatus according to claim 14 wherein the control circuit operates at least one of the input current adjusting circuit and the output current adjusting circuit based on a capacity of the power storage element.

17. The apparatus according to claim 14 wherein the control circuit operates at least one of the input current adjusting circuit and the output current adjusting circuit based on a number of the power storage elements.

18. The apparatus according to claim 14 further comprising a characteristic input circuit to designate the characteristic of the power storage element.

* * * * *